(12) United States Patent
Nakamura

(10) Patent No.: US 9,811,131 B2
(45) Date of Patent: Nov. 7, 2017

(54) INFORMATION PROCESSING APPARATUS, METHOD AND STORAGE MEDIUM FOR CONTROLLING POWER SHIFTING BASED ON WHETHER SEARCH PACKET IS SERVICEABLE

(71) Applicant: CANON KABUSHIKI KAISHA, Tokyo (JP)

(72) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 13/687,745

(22) Filed: Nov. 28, 2012

(65) Prior Publication Data

US 2013/0091366 A1 Apr. 11, 2013

Related U.S. Application Data

(63) Continuation of application No. 12/748,074, filed on Mar. 26, 2010, now Pat. No. 8,347,125.

(30) Foreign Application Priority Data

Mar. 30, 2009 (JP) .................................. 2009-082083

(51) Int. Cl.
*G06F 1/32* (2006.01)
*G06F 1/26* (2006.01)
*H04N 1/00* (2006.01)

(52) U.S. Cl.
CPC .............. *G06F 1/26* (2013.01); *G06F 1/3209* (2013.01); *H04N 1/00885* (2013.01); *H04N 1/00891* (2013.01); *H04N 1/00896* (2013.01); *H04N 1/00973* (2013.01)

(58) Field of Classification Search
CPC ..... G06F 1/3203; G06F 1/3209; G06F 1/3234
USPC ......................................................... 713/300
See application file for complete search history.

(56) References Cited

U.S. PATENT DOCUMENTS

| 6,101,608 A * | 8/2000 | Schmidt et al. .................. 726/2 |
| 6,947,977 B1 * | 9/2005 | Kley .................. G06Q 20/3821 709/203 |
| 7,324,462 B1 * | 1/2008 | Page ..................... H04W 8/005 370/255 |
| 7,600,137 B2 * | 10/2009 | Trappeniers ............ H04L 12/12 709/224 |
| 2001/0033554 A1 * | 10/2001 | Ayyagari ................ H04L 29/06 370/328 |

(Continued)

FOREIGN PATENT DOCUMENTS

| JP | 2003-191570 A | 7/2003 |
| JP | 2005-335255 A | 12/2005 |

(Continued)

*Primary Examiner* — Kim Huynh
*Assistant Examiner* — Danny Chan
(74) *Attorney, Agent, or Firm* — Canon USA Inc., IP Division

(57) ABSTRACT

An apparatus determines, when receiving a packet transited via a network in a power saving mode, whether or not the packet is a packet according to a predetermined protocol. If the packet is determined to be the packet according to a predetermined protocol, the apparatus analyzes the data of a succeeding packet described in a data description language, and instructs the apparatus to return from the power saving mode to a normal power mode depending on an analysis result.

8 Claims, 13 Drawing Sheets

(56) References Cited

U.S. PATENT DOCUMENTS

| | | | |
|---|---|---|---|
| 2002/0065042 A1* | 5/2002 | Picoult | H04M 3/53333 455/41.3 |
| 2002/0140963 A1* | 10/2002 | Otsuka | G06K 15/00 358/1.14 |
| 2003/0095524 A1* | 5/2003 | Stephens | H04L 29/06 370/338 |
| 2004/0246961 A1* | 12/2004 | Dai et al. | 370/392 |
| 2005/0007628 A1* | 1/2005 | Yamano et al. | 358/1.15 |
| 2005/0223248 A1* | 10/2005 | Lim et al. | 713/300 |
| 2006/0010331 A1* | 1/2006 | Ohara | 713/323 |
| 2007/0067445 A1* | 3/2007 | Vugenfirer et al. | 709/224 |
| 2007/0101345 A1* | 5/2007 | Takagi | 719/321 |
| 2008/0034240 A1* | 2/2008 | Park | G06F 1/3209 713/323 |
| 2008/0244586 A1* | 10/2008 | Hopp | 718/102 |
| 2009/0073481 A1* | 3/2009 | Ferlitsch et al. | 358/1.14 |
| 2009/0077169 A1* | 3/2009 | Ikeura et al. | 709/203 |
| 2009/0164816 A1* | 6/2009 | Yasuda | 713/320 |
| 2009/0228695 A1* | 9/2009 | Pathak | G06F 1/3203 713/1 |
| 2009/0240794 A1* | 9/2009 | Liu | H04L 29/08846 709/223 |
| 2010/0174808 A1* | 7/2010 | Dabagh et al. | 709/221 |
| 2010/0202424 A1* | 8/2010 | Chin et al. | 370/338 |

FOREIGN PATENT DOCUMENTS

| | | |
|---|---|---|
| JP | 2006-039940 A | 2/2006 |
| JP | 2006-040012 A | 2/2006 |
| JP | 2006-309731 A | 11/2006 |
| JP | 2007-334304 A | 12/2007 |
| JP | 2008-130093 A | 6/2008 |
| JP | 2008-176773 A | 7/2008 |
| JP | 2010-211764 A | 9/2010 |

* cited by examiner

FIG. 4

| ITEM | VALUE | POSITION FROM FRONT | |
|---|---|---|---|
| Ether HEADER | | | 401 |
| DESTINATION MAC ADDRESS | 01 00 5e 7f ff fd | 1~6 | |
| SOURCE MAC ADDRESS | — | 7~12 | 402 |
| FRAME TYPE | 08 00 | 13~14 | |
| IP HEADER | | | |
| VERSION/HEADER LENGTH | — | 15 | |
| SERVICE TYPE | — | 16 | |
| PACKET LENGTH | — | 17~18 | |
| IDENTIFIER | — | 19~20 | |
| FLAG/FRAGMENT OFFSET | — | 21~22 | |
| TTL | — | 23 | 403 |
| PROTOCOL NUMBER | 17 (0x11) | 24 | |
| HEADER CHECKSUM | — | 25~26 | |
| SOURCE IP ADDRESS | — | 27~30 | 404 |
| DESTINATION IP ADDRESS | 239.255.255.253 | 31~34 | |
| UDP HEADER | | | |
| SOURCE PORT NUMBER | — | 35~36 | 405 |
| DESTINATION PORT NUMBER | 427 (0x1ab) | 37~38 | |
| UDP DATA LENGTH | — | 39~40 | |
| UDP CHECKSUM | — | 41~42 | |
| SLP DATA | | | 406 |
| version | 2 | 43 | |
| function | — | 44 | |
| packet length | — | 45~47 | |
| flag | — | 48~49 | |
| next extention | — | 50~52 | |
| xid | — | 53~54 | |
| lang tag len | — | 55~56 | |
| lang tag | — | 57~58 | |
| PR-list len | — | 59~60 | |
| service type len | 6 | 61~62 | 407 |
| service type | "wakeup" | 63~68 | |
| scope list len | 5 | 69~70 | 408 |
| scope | "abcde" | 71~75 | |

FIG. 5

| ITEM | VALUE | POSITION FROM FRONT | |
|---|---|---|---|
| Ether HEADER | | | 501 |
| DESTINATION MAC ADDRESS | 01 00 5e 7f ff fd | 1~6 | |
| SOURCE MAC ADDRESS | — | 7~12 | 502 |
| FRAME TYPE | 08 00 | 13~14 | |
| IP HEADER | | | |
| VERSION/HEADER LENGTH | | 15 | |
| SERVICE TYPE | — | 16 | |
| PACKET LENGTH | — | 17~18 | |
| IDENTIFIER | — | 19~20 | |
| FLAG/FRAGMENT OFFSET | — | 21~22 | |
| TTL | — | 23 | 503 |
| PROTOCOL NUMBER | 17 (0x11) | 24 | |
| HEADER CHECKSUM | — | 25~26 | |
| SOURCE IP ADDRESS | — | 27~30 | 504 |
| DESTINATION IP ADDRESS | 239.255.255.250 | 31~34 | |
| UDP HEADER | | | |
| SOURCE PORT NUMBER | — | 35~36 | 505 |
| DESTINATION PORT NUMBER | 3702 (0xe76) | 37~38 | |
| UDP DATA LENGTH | — | 39~40 | |
| UDP CHECKSUM | — | 41~42 | |

FIG. 6

```
<s:Envelope
    xmlns:wsa="http://schemas.xmlsoap.org/ws/2004/08/addressing"
    xmlns:wsd="http://schemas.xmlsoap.org/ws/2005/04/discovery"         } 601
    xmlns:s="http://www.w3.org/2003/05/soap-envelope">
  <s:Header>
    <wsa:Action>http://schemas.xmlsoap.org/ws/2005/04/discovery/Resolve</wsa:Action>
    <wsa:MessageID>uuid:00000000-1111-2222-3333-444444444444</wsa:MessageID>
    <wsa:To>urn:schemas-xmlsoap-org:ws:2005:04:discovery</wsa:To>
  </s:Header>
  <s:Body>
    <wsd:Resolve>      602
      <wsa:EndpointReference>   603
        <wsa:Address>uuid:aaaaaaaa-bbbb-cccc-dddd-eeeeeeeeeeee</wsa:Address>
      </wsa:EndpointReference>
    </wsd:Resolve>
  </s:Body>
</s:Envelope>
```

FIG. 7

```
<s:Envelope
  xmlns:wsa="http://schemas.xmlsoap.org/ws/2004/08/addressing"
  xmlns:wsd="http://schemas.xmlsoap.org/ws/2005/04/discovery"
  xmlns:s="http://www.w3.org/2003/05/soap-envelope">
  <s:Header>
    <wsa:Action>http://schemas.xmlsoap.org/ws/2005/04/discovery/Probe</wsa:Action>
    <wsa:MessageID>uuid:00000000-1111-2222-3333-444444444444</wsa:MessageID>
    <wsa:To>urn:schemas-xmlsoap-org:ws:2005:04:discovery</wsa:To>
  </s:Header>
  <s:Body>          701
    <wsd:Probe>
      <wsd:Types>Printer</wsd:Types>    702
    </wsd:Probe>
  </s:Body>
</s:Envelope>
```

FIG. 9

| | | |
|---|---|---|
| IP ADDRESS | 192.168.0.1 | 901 |
| RETURN BY SLP | ON | 902 |
| RETURN BY WS-Discovery | ON | 903 |
| UUID | aaaaaaaa-bbbb-cccc-dddd-eeeeeeeeeeee | 904 |
| SERVICE TYPE | Printer,Scanner | 905 |
| FIXED PATTERN | FIRST FIXED PATTERN, SECOND FIXED PATTERN | 906 |

INFORMATION PROCESSING APPARATUS, METHOD AND STORAGE MEDIUM FOR CONTROLLING POWER SHIFTING BASED ON WHETHER SEARCH PACKET IS SERVICEABLE

CROSS-REFERENCE TO RELATED APPLICATION

This application is a Continuation of U.S. application Ser. No. 12/748,074, filed Mar. 26, 2010, which claims priority from Japanese Patent Application No. 2009-082083 filed Mar. 30, 2009, which are hereby incorporated by reference herein in their entireties.

BACKGROUND OF THE INVENTION

Field of the Invention

The present invention relates to an information processing apparatus that is connected to a network and is controlled to perform power saving.

Description of the Related Art

One of the recent environmental activities in the industry is improvement of the designs of information processing apparatuses such as printers and multifunction peripherals for power saving. To achieve power saving, generally an information processing apparatus shifts to a power saving (waiting) mode from a normal power mode for less power consumption when no operation of an operation panel or no job entry for printing via a network is detected during a predetermined period of time. Japanese Patent Application Laid-Open No. 2006-259906 discusses a communication control apparatus having power saving control means adapted to control operations of the apparatus in a power saving mode, in addition to normal operation control means adapted to control normal operations. The power saving control means monitors packets from a network, and returns the communication control apparatus from the power saving mode to a normal power mode when receiving a packet that satisfies a predetermined condition.

In the above conventional technology for returning from a power saving mode into a normal mode using a packet received from a network during monitoring, the return is determined based on whether the packet matches with a predetermined fixed packet pattern. The determination for the switch from a power saving mode tends to be incorrect when the packets received from a network have complicated structures. In the conventional technology, the device is returned to a normal power mode based on any packet that matches with a predetermined pattern. Accordingly, even if as a result of the analysis of the succeeding data of the packet the return of the apparatus to the normal power mode is not necessary, the apparatus returns to the power mode. Accordingly, in the conventional technology, there may be an issue regarding the needless return of an apparatus into a normal power mode, which results in waste of power and inefficient power saving.

SUMMARY OF THE INVENTION

According to an aspect of the present invention, an apparatus includes: a receiving unit configured to receive a packet transmitted via a network, while the apparatus is in a power saving mode, a determining unit adapted to determine whether or not the received packet received is a packet according to a predetermined protocol, an analyzing unit configured to analyze succeeding packet data described in a data description language to produce an analysis result, in a case where the packet is the packet according to the predetermined protocol, and an instructing unit configured to instruct the apparatus to return from the power saving mode to a normal power mode in response to the analysis result.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a return packet pattern using SLP.

FIG. 5 illustrates a fixed pattern of WS-Discovery packets.

FIG. 6 illustrates an example of a Resolve command.

FIG. 7 illustrates an example of a Probe command.

FIG. 9 illustrates an example of return information.

DESCRIPTION OF THE EMBODIMENTS

Various exemplary embodiments, features, and aspects of the invention will be described in detail below with reference to the drawings.

Figure 1:
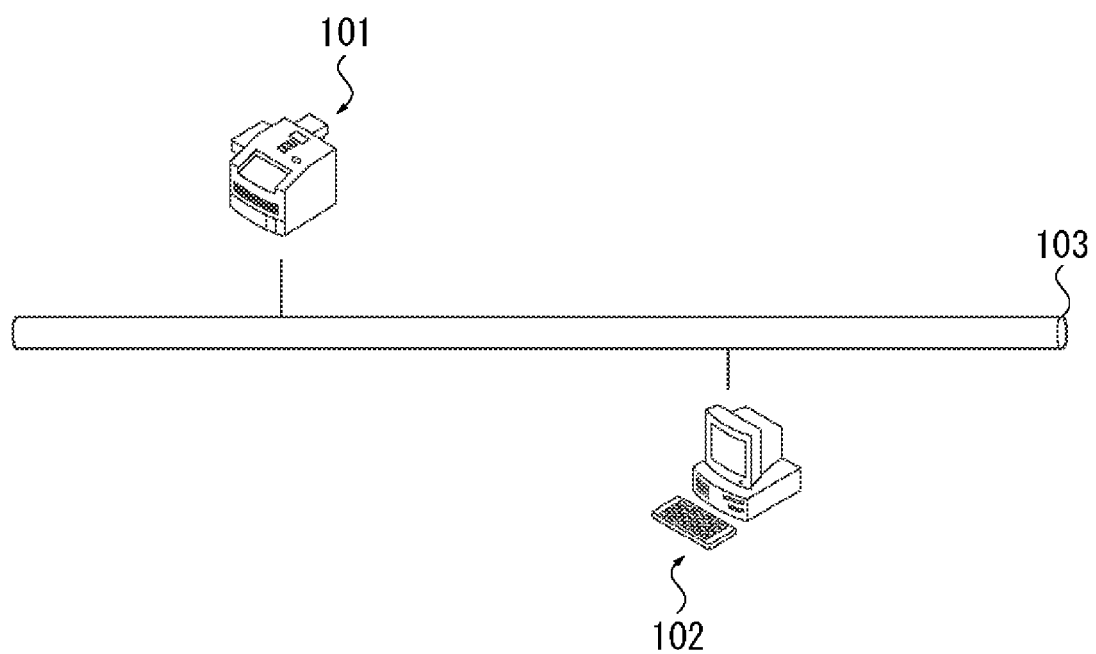
FIG. 1 illustrates a network system having an information processing apparatus according to the present invention.

A first exemplary embodiment is described below. FIG. 1 illustrates a configuration of a network system having an information processing apparatus according to the present invention. An information processing apparatus 101 is connected to a host computer 102 via a network 103 to enable mutual communication. The network 103 may be Local Area Network (LAN), WAN, or the Internet. The network 103 may be connected with or without wire. The network 103 may be connected to any apparatuses in addition to the information processing apparatus 101 and the host computer 102.

Figure 2:
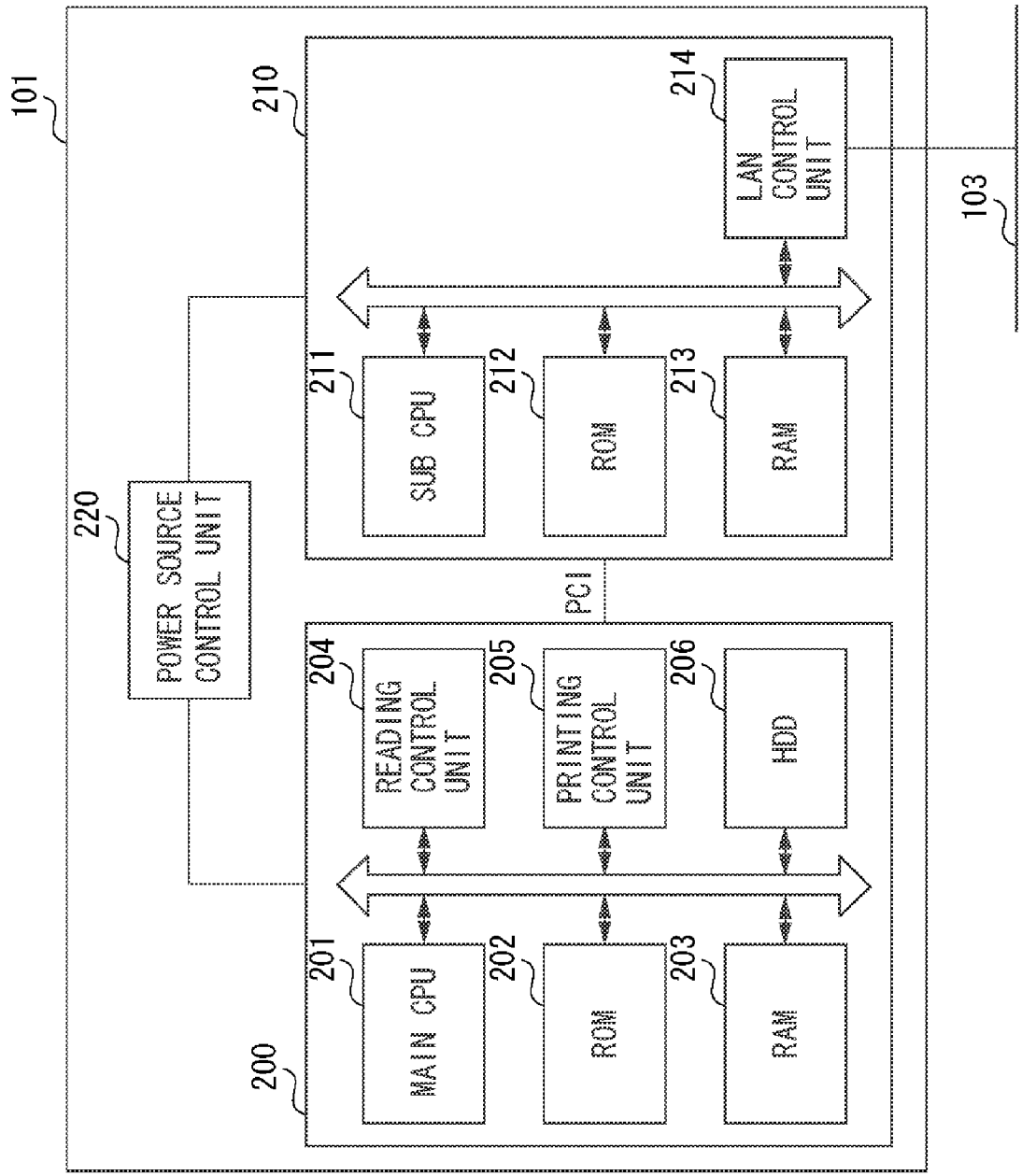
FIG. 2 is a block diagram illustrating a hardware configuration of an information processing apparatus.

FIG. 2 is a block diagram illustrating a hardware configuration of the information processing apparatus 101. The information processing apparatus 101 in this exemplary embodiment is a multifunction peripheral equipped with a scanner and a printer, but the information processing apparatus 101 may be a single unit of a printer, a scanner or a facsimile apparatus, or a personal computer (PC), for example.

The information processing apparatus 101 includes a main control unit 200 that is controlled by a MainCPU 201, and a sub-control unit 210 that is controlled by a SubCPU 211, the main control unit 200 being connected to the sub-control unit 210 via a PCI interface (not illustrated) using a PCI bus. The main control unit 200 controls a reading control unit 204 and a printing control unit 205, and implements the functions of scanning, printing, and copying as an information processing apparatus. The information processing apparatus 101 includes a scanner unit (not illustrated) connected to the reading control unit 204, and a printer unit (not illustrated) connected to the printing control unit 205.

These functions are controlled by programs stored in a read only memory (ROM) 202 and a hard disk drive (HDD) 206, and the programs are read by a random access machine (RAM) 203 and executed by the MainCPU 201 when the information processing apparatus 101 is activated. In this way, the information processing apparatus 101 provides the functions of scanning and printing to the network as services, and the host computer on the network is able to use the services provided by the information processing apparatus 101 via the network 103.

The sub-control unit 210 is a Network Interface Card (NIC) transmitting and receiving network packets via a LAN control unit 214. The sub-control unit 210 implements a minimum function for returning the information processing apparatus in the power saving mode into a normal power mode. The function is controlled by a program stored in the a read only memory (ROM) 212, and the program is read by a random access machine (RAM) 213 and executed by the SubCPU 211 when the information processing apparatus 101 is activated. As described later, the information processing apparatus is returned from the power saving mode based on information that is transmitted from the main control unit 200 to the sub-control unit 210 and stored in the RAM 203.

The power source control unit 220 can control the power supply to each of the blocks in the information processing apparatus 101. More specifically, the power source control unit 220 stops power supply to the main control unit 200 to return the main control unit 200 to the power saving mode to lower the power consumed by the entire apparatus. In the information processing apparatus 101 of this exemplary embodiment, the power source control unit 220 supplies power to both of the main control unit 200 and the sub-control unit 210 in the normal power mode. In the power saving mode, the power source control unit 220 supplies power only to the sub-control unit 210. In this mode, power is not supplied to the main control unit 200.

Figure 3A:
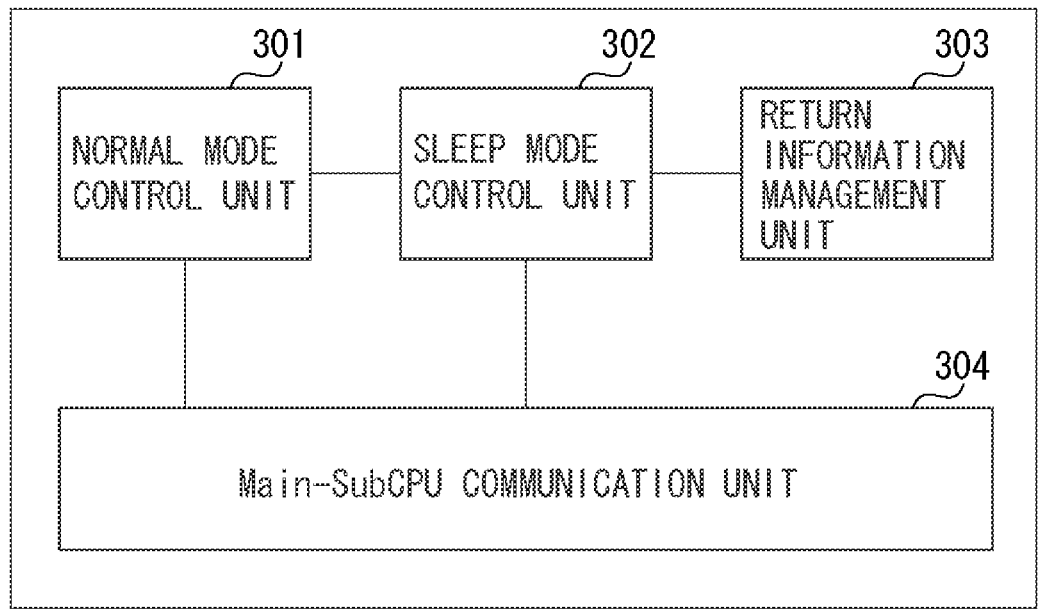
FIG. 3A is a block diagram illustrating a software configuration of a main control unit in an information processing apparatus.

FIG. 3A is a block diagram illustrating a software configuration of the main control unit 200 in the information processing apparatus 101. The software in each block is implemented in parallel by the MainCPU 201.

A normal mode control unit 301 controls operations of the information processing apparatus 101 in the normal power mode (not in the power saving mode). More specifically, the normal mode control unit 301 controls the operations of the functions of scanning, printing, and copying provided by the information processing apparatus 101. A return information management unit 303 manages and stores in the ROM 202 or HDD 206 the information of conditions for returning the apparatus 101 from the power saving mode to the normal power mode. A sleep mode control unit 302 obtains and transmits the return condition information managed by the return information management unit 303 to a Main-SubCPU communication unit 304, and sends an instruction to the power source control unit 220 for returning to the power saving mode. The Main-SubCPU communication unit 304 communicates with the Sub-Main communication unit 311 to transmit and receive information to and from the sub-control unit 210.

Figure 3B:
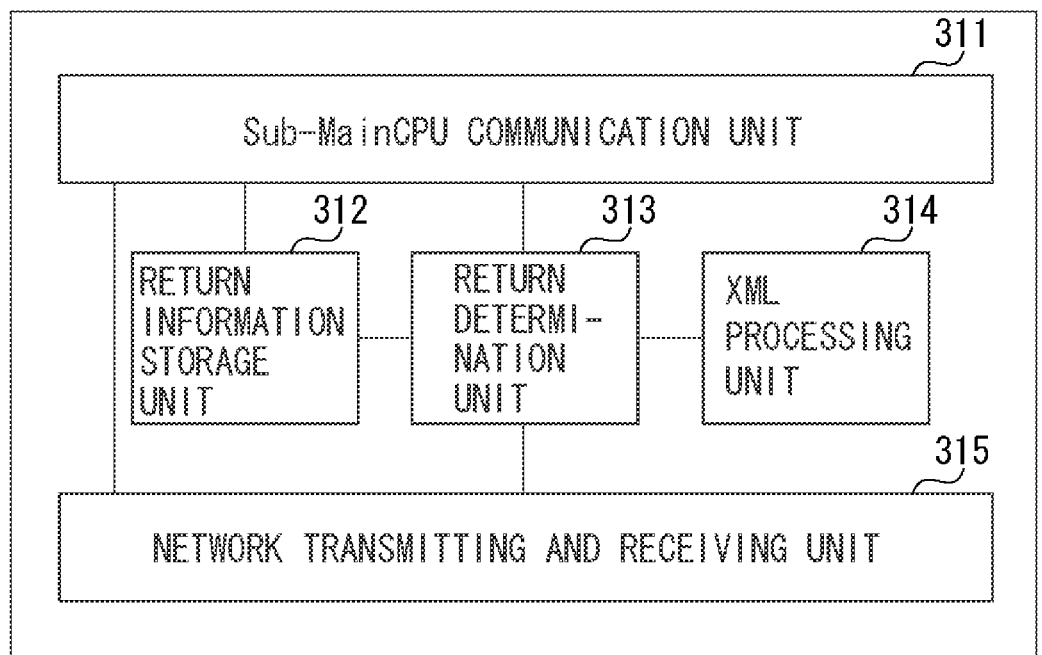
FIG. 3B is a block diagram illustrating a software configuration of a sub-control unit of the information processing apparatus.

FIG. 3B is a block diagram illustrating a software configuration of the sub-control unit 210 in the information processing apparatus 101. The software in each block is implemented in parallel by the SubCPU 211.

The Sub-MainCPU communication unit 311 communicates with the Main-Sub communication unit 304 to transmit and receive information to and from the main control unit 200. The return information storage unit 312 receives return condition information from the return information management unit 303 via the Sub-MainCPU communication unit 311, and stores the information in the ROM 212 or the RAM 213. The return determination unit 313 analyzes packets received from a network transmitting and receiving unit 315, and determines whether or not to return the information processing apparatus 101 to the normal power mode based on the information in the return information storage unit 312. The return determination unit 313 transmits the received packet to an XML processing unit 314 and determines return based on the analysis result in the cases where analysis of the XML data is performed for the determination for the return, as described later. The XML processing unit 314 analyzes XML data and transmits the analysis result to the return determination unit 313. The XML processing unit 314 has XML parser to fetch a value specified by XML namespace name or element name from the XML data.

In the normal power mode, the packet received by the network transmitting and receiving unit 315 is sent to the main control unit 200 as it is via the Sub-MainCPU communication unit 311. In the power saving mode, the packet received by the network transmitting and receiving unit 315 is sent to the return determination unit 313.

A packet that is used to return the information processing apparatus 101 from the power saving mode is described below. The information processing apparatus of this exemplary embodiment is returned to the normal power mode when receiving a packet transmitted using the two network communication protocols (hereinafter, referred to as protocols): SLP (Service Location Protocol) and WS-Discovery.

Both protocols use User Datagram Protocol (UDP) packets to search for an apparatus on a network by multicast transmission. A UDP packet is composed of, in sequence, an Ether header, an IP header, an UDP header, and application data.

The information processing apparatus 101 in the power saving mode of this exemplary embodiment determines whether or not the packet received by the network transmitting and receiving unit 315 is a packet that requires the return of the apparatus 101 from the power saving mode. For the determination, the information processing apparatus 101 has a predetermined fixed packet pattern (fixed pattern) therein. The fixed pattern is managed by the return information management unit 303, and sent to the sub-control unit 210 when the information processing apparatus 101 shifts into the power saving mode, to be held by the return information storage unit 312. The return information storage unit 312 holds a plurality of fixed patterns. The plurality of fixed patterns includes: a fixed pattern used to determine whether or not the received packet is an SLP return packet; and a fixed pattern used to determine whether or not the packet is a WS-Discovery packet. As described later, the return determination unit 313 in the sub-control unit 210 determines whether the packet is the SLP return packet or the WS-Discovery packet, by comparison between the received packet and the fixed patterns.

FIG. 4 illustrates a fixed pattern for the SLP return packet. The items 401 to 405 in FIG. 4 indicate the SLP packet. The SLP packet has data of "01 00 5e 7f ff fd" in the destination MAC address 401, data of "08 00" in the frame type 402, data of "17" in the protocol number 403, data of "239. 255. 255. 253" in the destination IP address 404, and data of "427" in the destination port number 405.

The data of the destination MAC address 401 corresponds to the first 6 Bytes of a received packet. The data of the frame type 402 corresponds to the $13^{th}$ and $14^{th}$ Bytes of the received packet. The data of the protocol number 403 corresponds to $24^{th}$ Bytes of the received packet. The data of the destination IP address 404 corresponds to $31^{st}$ to $34^{th}$ Bytes of the received packet. The data of the destination port number 405 corresponds to $37^{th}$ and $38^{th}$ Bytes of the received packet. Accordingly, the return determination unit 313 determines that a received packet is an SLP packet in the case where the received packet has data in the above items that each match with the corresponding data of the fixed pattern.

The items 406 to 408 in FIG. 4 are suggestive of an SLP packet for returning. An SLP return packet has data of "2" in the version 406, data of "wakeup" in the service type 407, and data of "abcde" in the scope 408.

The data of the version 406 corresponds to the $43^{rd}$ Byte of the received packet. The data of the service type 407 corresponds to the $63^{rd}$ to $68^{th}$ Byte of the received packet. The data of the scope 408 corresponds to the $71^{st}$ to $75^{th}$ Byte of the received packet. Accordingly, the return determination unit 313 determines that a received packet is an SLP return packet in the case where the received packet has data in the above items (401 to 408) that each match with the corresponding data of the fixed pattern.

When the information processing apparatus 101 receives a packet that matches with the fixed pattern in FIG. 4, the information processing apparatus 101 returns to the normal power mode. The pattern for an SLP return packet is only used to cause the information processing apparatus 101 in the power saving mode to return to the normal power mode, and the information processing apparatus 101 does not return response to the received SLP packet.

A fixed pattern for a WS-Discovery packet is described below. FIG. 5 illustrates a fixed pattern for a WS-Discovery packet. The items 501 to 505 in FIG. 5 indicate a WS-Discovery packet. A WS-Discovery packet has data of "01 00 5e 7f ff fa" in the destination MAC address 501, data of "08 00" in the frame type 502, data of "17" in the protocol number 503, data of "239. 255. 255. 250" in the destination IP address 504, and data of "3702" in the destination port number 505.

The data of the destination MAC address 501 corresponds to the first 6 Bytes of a received packet. The data of the frame type 502 corresponds to the $13^{rd}$ and $14^{th}$ Bytes of the received packet. The data of the protocol number 503 corresponds to $24^{th}$ Bytes of the received packet. The data of the destination IP address 504 corresponds to $31^{st}$ to $34^{th}$ Bytes of the received packet. The data of the destination port number 505 corresponds to $37^{th}$ and $38^{th}$ Bytes of the received packet. Accordingly, the return determination unit 313 determines that a received packet is a WS-Discovery packet in the case where the received packet has data in the above items that each match with the corresponding data of the fixed pattern.

As described above, when a received packet is an SLP packet, the data contents for the items 401 to 408 of the packet are compared with those in the fixed pattern in FIG. 4. In a WS-Discovery packet, however, unlike an SLP packet, the succeeding data contents of the packet is described in XML, and the data position in the packet cannot be identified. This means the fixed pattern are useless in making a determination with respect to the succeeding data contents. Therefore, in the cases where a received packet is determined to be a WS-Discovery packet, the succeeding data contents are passed to XML parser for analysis, so that the resulting analysis is used to finally determine whether or not to return the information processing apparatus 101 from the power saving mode.

Among the commands defined by WS-Discovery protocol, a "Resolve" command and a "Probe" command are used in this exemplary embodiment. The Resolve command is used to search for an apparatus having a predetermined Universally Unique Identifier (UUID) on a network. If the apparatus has the predetermined UUID, when receiving the Resolve command, a ResolveMatch response via unicast is to be sent back. The UUID is unique, and only one apparatus responds to the Resolve command.

The Probe command is used to search for an apparatus having a predetermined service type on a network. The service type may be "Printer" for a printing service, or "Scanner" for a scanning service, for example. The apparatus with the predetermined service type, when receiving the Probe command, sends back a ResolveMatch response via unicast. To the Probe command, all of the apparatuses having the predetermined service type respond.

FIG. 6 illustrates an example of the Resolve command in a WS-Discovery packet in this exemplary embodiment. In FIG. 6, the element 602 <wsd:Resolve> shows that the command is a Resolve command. Existence and non-existence of blank spaces and blank lines make no difference in meaning, as defined in XML. Similarly, the prefixed string of letters "wsd:" is defined in a namespace declaration 601, and any string of letters can be used if a namespace is the same. In other words, the identification of a Resolve command defined by WS-Discovery is based on the interpretation of a namespace declaration in XML, and no prefixed string of letters can be stored in advance. The UUID of an apparatus to be searched for is specified by the element 603 <wsa:EndpointReference>. In the case where the element value matches with the UUID of the apparatus, the information processing apparatus 101 is determined to return from the power saving mode.

FIG. 7 illustrates an example of a Probe command in a WS-Discovery packet in this exemplary embodiment. In FIG. 7, the element 701 <wsd:Probe>shows that the command is a Probe command. The above definition in XML is also applied to the Probe command. In other words, existence and non-existence of blank spaces and blank lines make no difference in meaning, as defined in XML. Similarly, the prefixed string of letters "wsd:" is defined in a namespace declaration, and any string of letters can be used if the namespace is same. In other words, the identification of a Probe command defined by WS-Discovery is based on the interpretation of a namespace declaration in XML, and no prefixed string of letters can be stored in advance. The service type to be searched is specified by the element 702 <wsd:Types>. In the case where the element value matches with a service type of the apparatus, the information processing apparatus 101 is determined to return from the power saving mode.

Next, operations by the sleep mode control unit 302 to cause the main control unit 200 to shift from the normal power mode into the power saving mode, are described with reference to the flowchart in FIG. 8. The steps in FIG. 8 are implemented by the MainCPU 210 in the information processing apparatus 101 according to the program in the ROM 202.

At S801, the sleep mode control unit 302 monitors the period of time elapsed after a last operation using an operation panel (not illustrated) or a last job entry for printing via a network on the information processing apparatus 101, and determines whether or not a predetermined period of time has passed. In cases where a next operation or job entry is made before a predetermined period of time passes, a timer is reset for subsequent monitoring of the time. In contrast, when it is determined that a predetermined period of time has passed at S801, the process goes to S802. At S802, the sleep mode control unit 302 obtains return information from the return condition control unit 303, and transmits the information to the Main-SubCPU communication unit 304. The return information used here will be described later. At S803, the sleep mode control unit 302 transmits an instruction to the power source control unit 220 for transition to the power saving mode, then the process ends. The power control unit 220 stops power supply to the main control unit 200.

Figure 8:
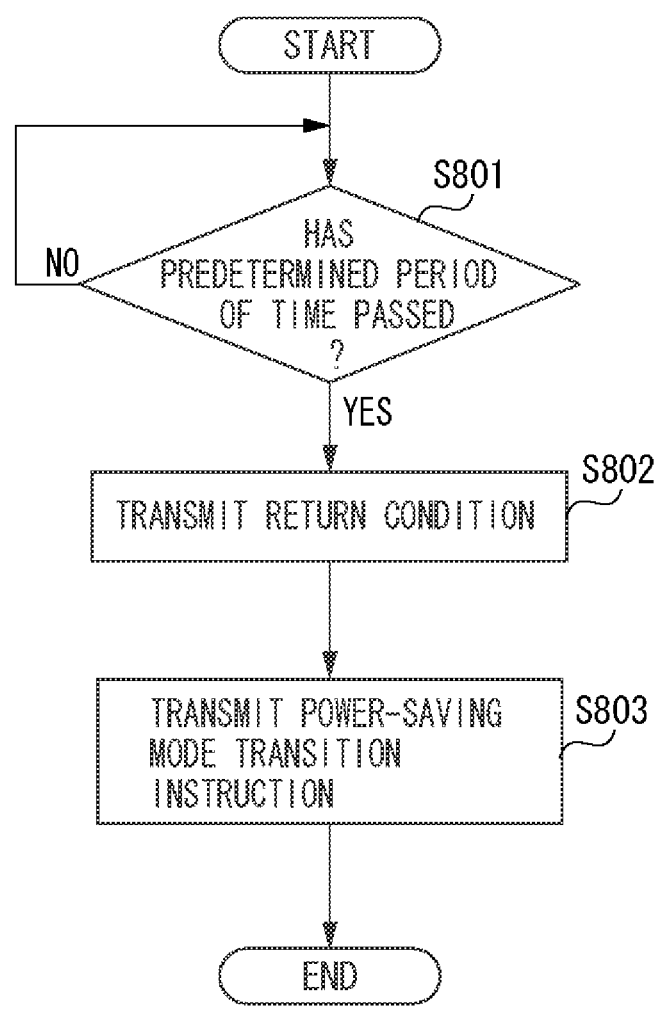
FIG. 8 is a flowchart illustrating operations of a sleep mode control unit.

FIG. 9 illustrates return information the sleep mode control unit 302 transmits to the Main-SubCPU communication unit 304 at S802 of the flowchart in FIG. 8. The item 901 contains an IP address of the information processing apparatus 101. The item 902 contains information about whether to return at a receipt of an SLP return packet. The item 903 contains information about whether to return at the time of a receipt of a WS-Discovery packet. In this exemplary embodiment, the items 902 and 903 contain "ON" for returning from the power saving mode at a receipt of either packet. The values in the items 902 and 903 may be changed and set if desired by a user such as a manager of the information processing apparatus 101.

The item 904 contains a UUID value of the information processing apparatus 101. The UUID is unique to the apparatus, and does not change at power OFF/ON. The item 905 contains a service type the information processing apparatus 101 provides. The item 905 contains "Printer" and "Scanner" for the information processing apparatus 101 in this exemplary embodiment that provides a printing and a scanning service. The item 906 contains a fixed pattern which is used to determine whether to return the information processing apparatus 101 from the power saving mode. The return information of this exemplary embodiment includes two fixed patterns (a first fixed pattern, and a second fixed pattern): a fixed pattern used in identifying a WS-Discovery packet; and a fixed pattern used in identifying an SLP return packet.

The Main-SubCPU communication unit 304 transmits return information received from the sleep mode control unit 302 to the Sub-MainCPU communication unit 311, and the return information storage unit 312 puts and stores the received return information in the RAM 213 (or the ROM 212).

Figure 10:
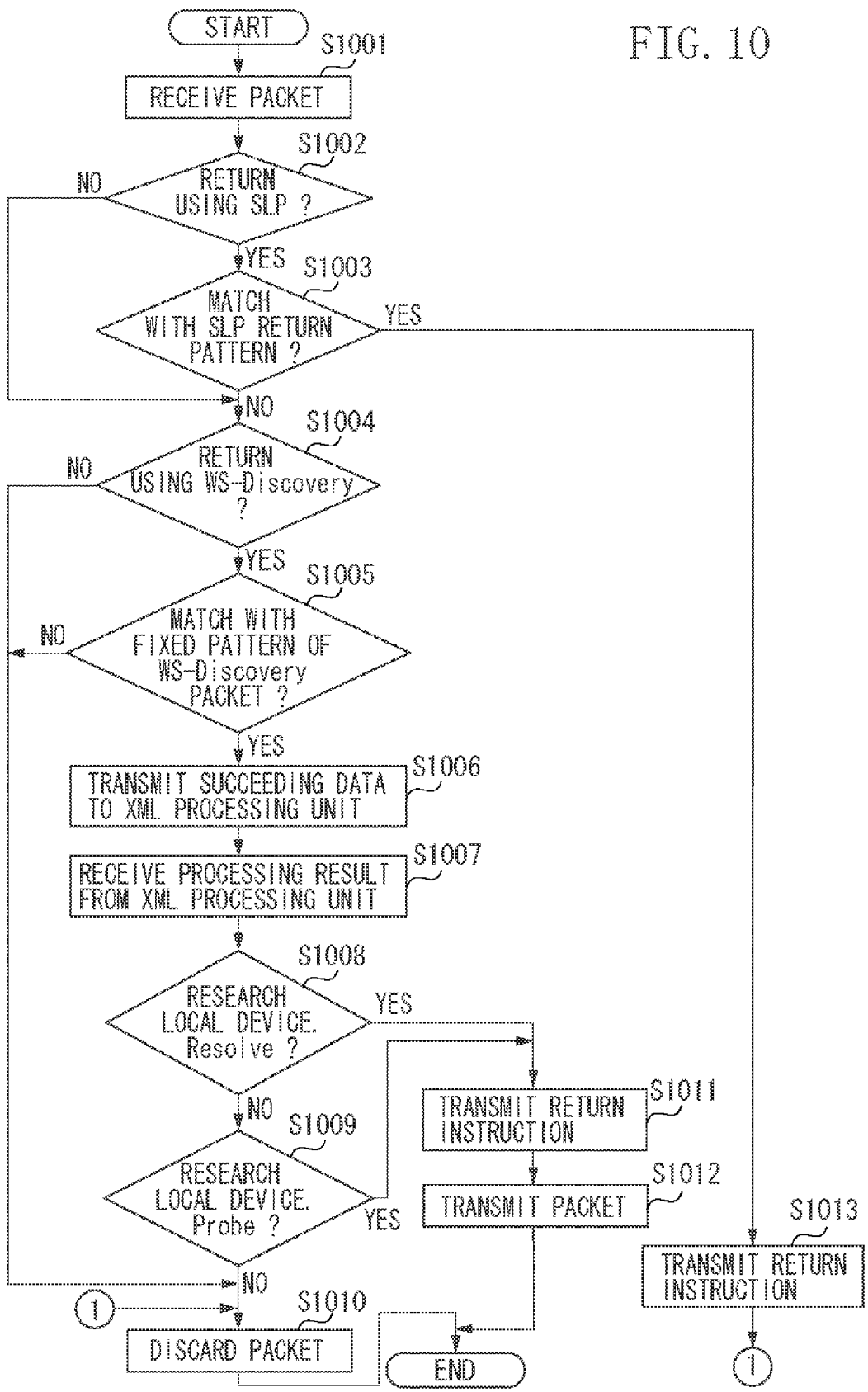
FIG. 10 is a flowchart illustrating operations of a return determination unit.

Operations by the return determination unit 313 while the information processing apparatus 101 is in the power saving mode are described below with reference to the flowchart in FIG. 10. The steps in FIG. 10 are implemented by the SubCPU 211 in the information processing apparatus 101 according to the program in the ROM 212.

At S1001, the return determination unit 313 obtains a packet the network transmitting and receiving unit 315 received from the network 103. At S1002, the return determination unit 313 checks if the SLP packet is used for return. More specifically, the return determination unit 313 refers to the return information contained in the item 902 of the return information (FIG. 9). In the case of the information of ON, the return determination unit 313 determines to return by the SLP return packet, and in the case of the information of OFF, the return determination unit 313 determines not to return. The process goes to S1004 if non-return is determined, and goes to S1003 if return is determined.

At S1003, the return determination unit 313 compares the packet received at S1001 with the fixed pattern of an SLP return packet in FIG. 4 to determine whether or not the received packet matches with the fixed pattern. The return determination unit 313 determines whether or not the received packet contains the data in the items 401 to 408 in FIG. 4., as described above. If YES at S1003, the process goes to S1013, where the return determination unit 313 transmits an instruction for returning to the power source control unit 220. At S1010, the return determination unit 313 discards the packet received at S1001 and the process ends.

If NO at S1003, the process goes to S1004, where the return determination unit 313 determines whether to return the information processing apparatus 101 by a WS-Discovery packet. More specifically, the return determination unit 313 refers to the return information (FIG. 9) in the return information storage unit 312, and determines to return the information processing apparatus 101 by the WS-Discovery packet if the return information is ON, and determines not to return if the return information is OFF. In the case where non-return by the WS-Discovery packet is determined, the process goes to S1010, and the return determination unit 313 discards the packet received at S1001 to end the process. In the case where return by the WS-Discovery packet is determined, the process goes to S1005.

At S1005, the return determination unit 313 determines whether or not the packet received at S1001 is a WS-Discovery packet. The return determination unit 313 compares the packet received at S1001 with the fixed pattern for a WS-Discovery packet in FIG. 5 to determine whether or not the received packet matches with the fixed pattern for the WS-Discovery packet. More specifically, the return determination unit 313 determines whether or not the received packet contains the data in the items 501 to 508 in FIG. 5. If No at S1005, the process goes to S1010, where the return determination unit 313 discards the packet received at S1001 to end the process. If YES at S1005, the process goes to S1006, where the return determination unit 313 transmits the succeeding packet data to the XML processing unit 314. This is because in the case where the received packet is a WS-Discovery packet, the succeeding packet is XML data which is analyzed by the XML processing unit 314.

Figure 11:
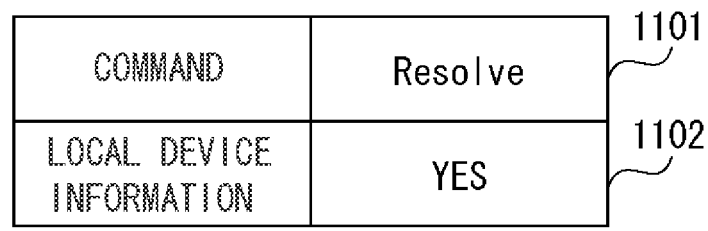
FIG. 11 illustrates an example of an analysis result.

At S1007, the return determination unit 313 receives the analysis result of the XML data from the XML processing unit 314. FIG. 11 illustrates an example of the analysis result from the XML processing unit 314. The item 1101 contains an analyzed command of WS-Discovery, which is described by one of Resolve, Probe, and unknown. The item 1102 contains YES information if the command is a Resolve command for searching for an UUID of the apparatus or a Probe command for searching for a service type of the apparatus, and otherwise contains NO information.

At S1008, the return determination unit 313 refers to the received analysis result to determine whether or not the XML data is a Resolve command for searching for the apparatus. More specifically, the return determination unit 313 determines the data as a Resolve command in the case where the received analysis result contains "Resolve" in the item 1101. In addition to the determination, if "Yes" is described in the item 1102, the return determination unit 313 determines that the apparatus matches with the search condition described in the XML data. In other words, if the "Resolve" is described in the item 1101 and "Yes" in the item 1102 in the analysis result, the data is determined to be a Resolve command that was searching for the apparatus.

If Yes at S1008, the process goes to S1011, where the return determination unit 313 transmits an instruction for returning to the power source control unit 220. At S1012, the return determination unit 313 transmits the entire packet which it has received, to the Sub-MainCPU communication unit 311 and the process ends. As a result, the received entire packet is sent to the main control unit 200 to analyze XML data again at the main control unit 200. The main control unit 200 generates response data (response XML data) to the XML data. The sub-control unit 210 does not generate response data (response XML data) to the XML data because the XML processing unit 314 in the sub-control unit 210 does not have a function to generate XML data. The sub-control unit 210 is packaged with simple software only for interpretation of XML, therefore less power is consumed in the power saving mode.

If NO at S1008, the process goes to S1009. At S1009, the return determination unit 313 determines whether or not the analysis result shows a Probe command that was searching for the apparatus. More specifically, the return determination unit 313 determines the result as a Probe command based on the description of "Probe" in the item 1101. In addition, if "Yes" is described in the item 1102, the return determination unit 313 determines that the apparatus matches with the search condition described in the XML data. In other words, if the "Probe" is described in the item 1101 and "Yes" in the item 1102 in the analysis result, the XML data is determined to be a Probe command that was searching for the apparatus.

If Yes at S1009, the process goes to S1011, where the return determination unit 313 transmits an instruction for returning to the power source control unit 220. At S1012, the return determination unit 313 transmits the entire packet which it has received to the Sub-MainCPU communication unit 311 and the process ends.

After the process at S1012, the Sub-MainCPU communication unit 311 transmits the received entire packet to the Main-SubCPU communication unit 304. As a result, the received entire packet is processed in the main control unit 200.

Figure 12:
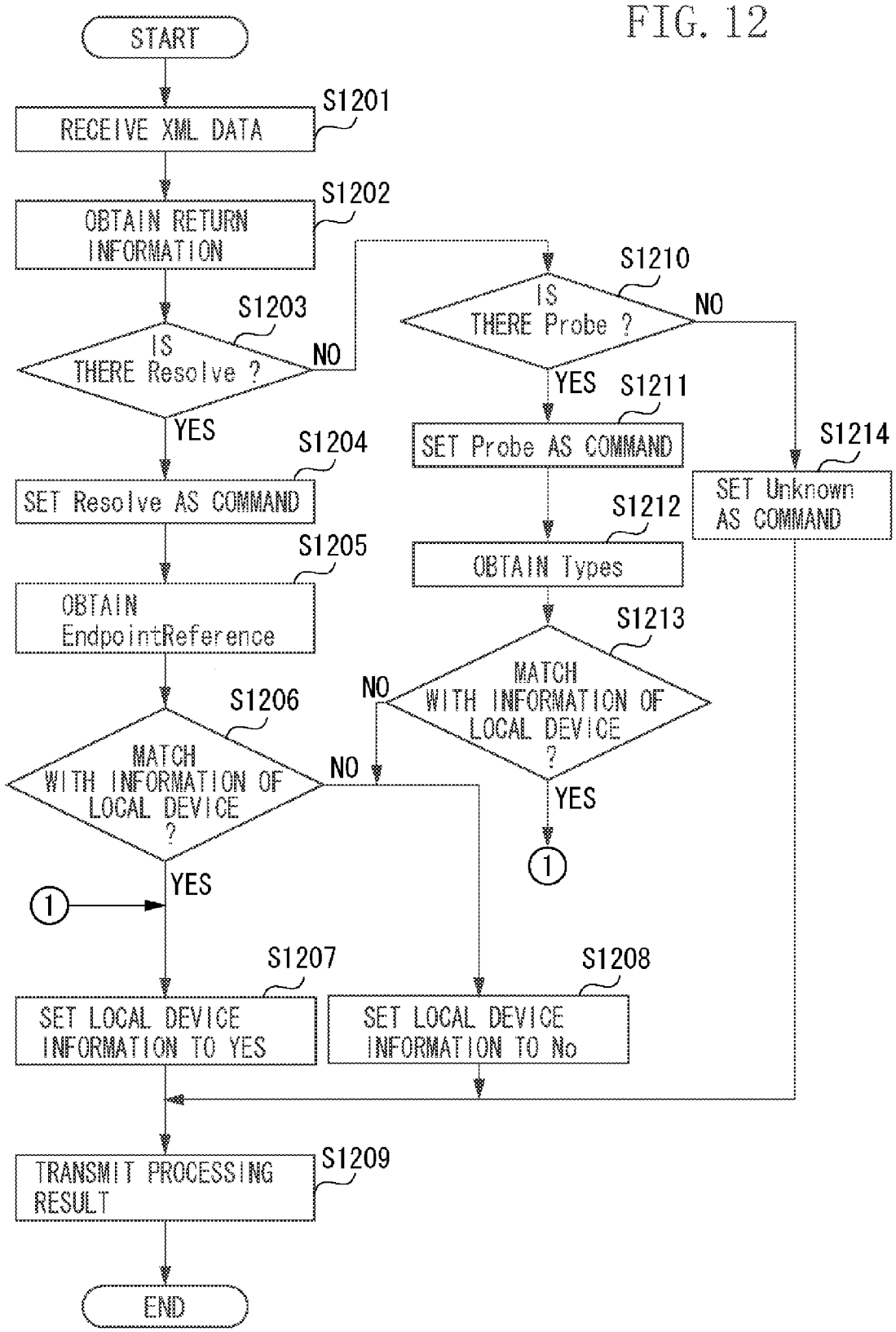
FIG. 12 is a flowchart illustrating operations of an XML processing unit.

FIG. 12 is a flowchart illustrating operations of the XML processing unit 314. The operations in the flowchart in FIG. 12 are performed when the XML processing unit 314 receives XML data from the return determination unit 313 at S1006 in FIG. 10. The steps in FIG. 12 are implemented by the SubCPU 211 in the information processing apparatus 101.

At S1201, the XML processing unit 314 receives XML data from the return determination unit 313. At S1202, the XML processing unit 314 obtains return information from the return information storage unit 312. At S1203, the XML processing unit 314 analyzes the XML data to determine whether or not the XML data contains a Resolve element. In the analysis, a namespace name of "http://schemas.xmlsoap.org/ws/2005/04/discovery/" is specified. If a Resolve element is found, the process goes to S1204, where the XML processing unit 314 sets the resulting command value to be "Resolve".

At S1205, the XML processing unit 314 obtains the value of an EndpointReference element in the XML data. When the value is obtained, a namespace name of "http://schemas.xmlsoap.org/ws/2004/08/addressing" is specified. At S1206, the XML processing unit 314 determines whether or not the obtained EndpointReference value matches with the UUID value 904 of the return information. If there is a match, at S1207, the XML processing unit 314 sets the resulting value of the apparatus information to be "Yes". If there is no match, at S1208, the XML processing unit 314 sets the resulting value of the apparatus information to be "No". Then, at S1209, the XML processing unit 314 transmits the process result to the return determination unit 313, and the process ends.

If NO at S1203, the process goes to S1210, where the XML processing unit 314 determines whether or not the XML data contains a Probe element. In the determination, a namespace name of "http://schemas.xmlsoap.org/ws/2005/04/discovery" is specified. If a Probe element is found, the process goes to S1211, where the XML processing unit 314 sets the resulting command value to be "Probe". At S1212, the XML processing unit 314 obtains the values of Types elements in the XML data. When the values are obtained, a namespace name of "http://schemas.xmlsoap.org/ws/2005/04/discovery" is specified. At S1213, the XML processing unit 314 determines whether or not the obtained Types values include a value that matches with the service type value 905 in the return information. If Yes, at S1207, the XML processing unit 314 sets the resulting value of the apparatus information to be "Yes". If NO, at S1208, the XML processing unit 314 sets the resulting value of the apparatus information to be "No". Then, at S1209, the XML processing unit 314 transmits the process result to the return determination unit 313, and the process ends.

If no Probe element is found at S1210, the process goes to S1214, where the XML processing unit 314 sets the resulting command value to be "unknown". At S1209, the XML processing unit 314 transmits the process result to the return determination unit 313, and the process ends.

As described above, according to this exemplary embodiment, when the information processing apparatus in the power saving mode receives a packet, operations for the packet transmission are performed depending on the protocol. More specifically, the succeeding XML data may be analyzed to determine whether the information processing apparatus is switched to the normal power mode according to the analysis result. Thus, it can be determined whether the information processing apparatus is to return to the normal power mode, using the packet which is not useful in the conventional apparatus, that can only check the packet for matching with a predetermined pattern. Therefore, the determination of whether the information processing apparatus is to return to the normal power mode at the time of a receipt of a packet becomes more correct, and the power saving efficiency of the information processing apparatus is significantly improved. Furthermore, with respect to a packet that does not require the analysis of XML data, or a packet that can be determined only by the matching with a predetermined pattern, no extra operations are performed, and thereby the determination of return to the normal power mode is efficiently made.

A second exemplary embodiment is now described below. In this exemplary embodiment, an information processing apparatus 101 has degeneracy property. Degeneracy typically means that, even when apart of functions becomes impaired, the other normal functions are not stopped and continue to be used so that the overall operations continue. For example, the information processing apparatus 101 is able to receive data for printing from the host computer 102 via a network and print the data, without stopping the overall apparatus, even when a scanner (not illustrated) thereof fails to operate and reading of original document cannot be carried out.

The information processing apparatus 101 checks a current degeneracy state thereof before shifting to the power saving mode, and responds only to Probe that searches for an operational service type before returning to the normal power mode. Thus, the possibility to maintain the power saving mode is increased.

Only the difference between the first and second exemplary embodiments is described, and the same operations will not be described below.

The information processing apparatus 101 of this exemplary embodiment has a software configuration in the main control unit 200 which is different from that of the information processing apparatus 101 in the first exemplary embodiment. The information processing apparatus 101 of this exemplary embodiment further includes a degeneracy state control unit in a main control unit 200. The degeneracy state control unit is implemented by a MainCPU 201. The degeneracy state control unit keeps a current degeneracy state of the information processing apparatus 101.

Figure 13:
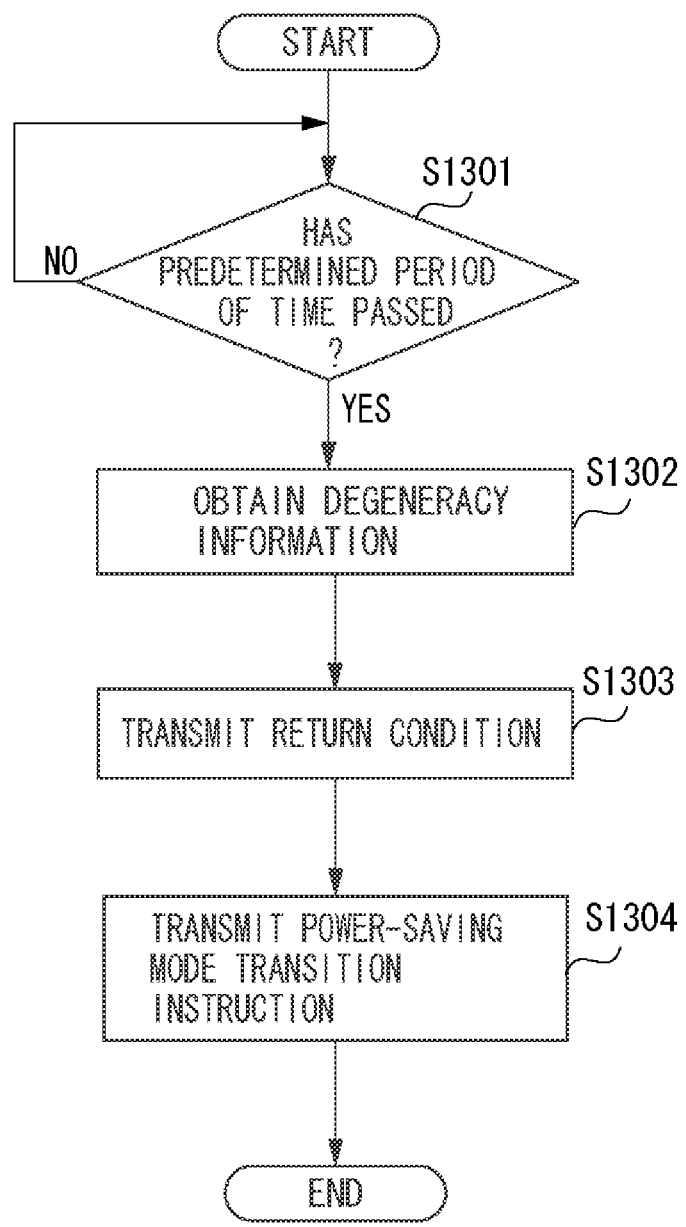
FIG. 13 is a flowchart illustrating operations of a sleep mode control unit.

Operations of a sleep mode control unit 302 when the main control unit 200 shifts to the power saving mode in this exemplary embodiment are described below with reference to the flowchart in FIG. 13. The steps in FIG. 13 are implemented by the MainCPU 201.

At S1301, the sleep mode control unit 302 monitors the period of time elapsed after a last operation in which an operation panel (not illustrated) or a last job entry for printing via a network on the information processing apparatus 101 is used, and determines whether or not a predetermined period of time has passed. In cases where a next operation or job entry is made before a predetermined period of time passes, a timer is reset for subsequent monitoring of the time. In contrast, when it is determined that a predetermined period of time has passed at S1301, the process goes to S1302. At S1302, the sleep mode control unit 302 obtains a degeneracy state from the degeneracy state control unit 1401. In other words, the sleep mode control unit 302 obtains information indicating a service type the information processing apparatus 101 can provide at the moment.

At S1303, the sleep mode control unit 302 obtains return information from the return condition control unit 303. The sleep mode control unit 302 changes the return information based on the degeneracy state obtained at S1302, and transmits the resulting information to the Main-SubCPU communication unit 304. For example, even if there are originally two available services of printing and scanning and the return condition control unit 303 has the information for the printing service and scanning service, when the scanner is out of service, only the "Printer" is described in the item 1005 in FIG. 10 as the return information. At S1304, the sleep mode control unit 302 transmits an instruction to the power source control unit 220 for shifting to the power saving mode, and the process ends.

As described above, the determination for returning to the normal power mode is made in this exemplary embodiment in a more cautious manner than that in the first exemplary embodiment, by taking consideration of a current state of the information processing apparatus 101. Every time the information processing apparatus 101 shifts to the power saving mode, the service the information processing apparatus 101 can provide at the moment is checked, which is kept in the sub-control unit. This maintains the power saving mode more efficiently, and further improves the power saving efficiency of the information processing apparatus.

The SLP and WS-Discovery in the above exemplary embodiments are used as examples of protocols (a first protocol and a second protocol) processable by an information processing apparatus, and other protocols may also be used. For example, Simple Network Management Protocol (SNMP) may be used. Also, the XML data in the above exemplary embodiments is used as an example of data description languages, and other data description language such as HTML data may be used.

Furthermore, in the above exemplary embodiments, both of the main control unit and the sub-control unit are physically incorporated in one information processing apparatus, but the main control unit and the sub-control unit may be physically incorporated in separate housings. In the latter case, the main control unit is directly connected to the sub-control unit using a predetermined interface (e.g., USB, Centronics I/F, LAN), so that the main control unit and the sub-control unit form one information processing system.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A printing apparatus having a plurality of services including at least a printing service and a scanning service, the printing apparatus comprising:

a first control unit configured to receive a packet transmitted from an external apparatus;

a second control unit configured to generate response data responding to the packet; and a power supply unit configured to supply power to the second control unit, wherein, in a case where power is not supplied to the second control unit by the power supply unit and the packet received by the first control unit is a search packet for searching for a device having a specific service, the first control unit is configured to determine whether the printing apparatus itself has the specific service specified by the search packet, in a case where it is determined that the printing apparatus itself has the specific service specified by the search packet, the first control unit is configured to cause the power supply unit to supply power to the second control unit which generates the response data and uses the response data in responding to the packet, in a case where it is determined that the printing apparatus itself does not have the specific service specified by the search packet, the second control unit remains without power from the power supply unit and the first control unit does not respond to the packet, at least in a case where the specific service specified by the search packet is the printing service, the first control unit determines that the printing apparatus itself has the specific service specified by the search packet, and at least in a case where the specific service specified by the search packet is the scanning service, the first control unit determines that the printing apparatus itself has the specific service specified by the search packet.

2. The printing apparatus according to claim 1, wherein, in a case where it is determined that the printing apparatus itself does not have the specific service specified by the search packet, the first control unit discards the search packet.

3. The printing apparatus according to claim 1, wherein the search packet is a WS-Discovery packet.

4. The printing apparatus according to claim 3, wherein the specific service subjected to the searching is specified by a Probe command of the WS-Discovery packet.

5. The printing apparatus according to claim 1, further comprising:
 a setting unit configured to set service information indicating the plurality of services),
 wherein it is determined whether the printing apparatus itself has the specific service subjected to the searching which is specified by the search packet, based on the service information set by the setting unit.

6. The printing apparatus according to claim 5, wherein the setting unit sets the service information for the first control unit when the power supply unit supplies power to the second control unit.

7. A method for controlling printing apparatus having a plurality of services including at least a printing service and a scanning service, the printing apparatus including a first control unit configured to receive a packet transmitted from an external apparatus, a second control unit configured to generate response data responding to the packet and a power supply unit configured to supply power to the second control unit, the control method comprising:
 receiving, by the first control unit, a packet transmitted from an external apparatus;
 determining, by the first control unit, in a case where power is not supplied to the second control unit and the received packet is search packet for searching for a device having a specific service, whether the printing apparatus itself has the specific service specified by the search packet;
 supplying power to the second control unit to generate response data and use the response data in responding to the packet, in a case where it is determined that the printing apparatus itself has the specific service specified by the search packet,
 causing the second control unit to remain without power and not respond to the packet in a case where it is determined that the printing apparatus itself does not have the specific service by the search packet, wherein
 at least in a case where the specific service specified by the search packet is the printing service, the first control unit determines that the printing apparatus itself has the specific service specified by the search packet, and
 at least in a case where the specific service specified by the search packet is the scanning service, the first control unit determines that the printing apparatus itself has the specific service specified by the search packet.

8. A non-transitory storage medium for an printing apparatus having a plurality of services including at least a printing service and a scanning service, the printing apparatus including a first control unit configured to receive a packet transmitted from an external apparatus, a second control unit configured to generate response data responding to the packet and a power supply unit configured to supply power to the second control unit, the control method, the storage medium containing instructions for a processor, the instructions, when executed by the processor, perform operations comprising:
 receiving, by the first control unit, a packet transmitted from an external apparatus;
 determining, by the first control unit, in a case where power is not supplied to the second control unit and the received packet is search packet for searching for a device having a specific service, whether the printing apparatus has the specific service specified by the search packet; and
 supplying power to the second control unit to generate response data and use the response data in responding to the packet, in a case where it is determined that the printing apparatus itself has the specific service specified by the search packet, and,
 causing the second control unit to remain without power and not respond to the packet in a case where it is determined that the printing apparatus itself does not have the specific service by the search packet, wherein
 at least in a case where the specific service specified by the search packet is the printing service, the first control unit determines that the printing apparatus itself has the specific service specified by the search packet, and
 at least in a case where the specific service specified by the search packet is the scanning service, the first control unit determines that the printing apparatus itself has the specific service specified by the search packet.

* * * * *